(12) United States Patent
Roth

(10) Patent No.: US 7,123,434 B2
(45) Date of Patent: Oct. 17, 2006

(54) SYSTEM AND METHOD FOR PERPENDICULARLY RECORDED SERVO PATTERN

(75) Inventor: Maxim Roth, Cupertino, CA (US)

(73) Assignee: Matsushita Electric Industrial, Co., Ltd., Osaka (JP)

( * ) Notice: Subject to any disclaimer, the term of this patent is extended or adjusted under 35 U.S.C. 154(b) by 18 days.

(21) Appl. No.: 11/012,938

(22) Filed: Dec. 15, 2004

(65) Prior Publication Data

US 2005/0141123 A1 Jun. 30, 2005

Related U.S. Application Data

(60) Provisional application No. 60/532,431, filed on Dec. 24, 2003, provisional application No. 60/532,395, filed on Dec. 24, 2003.

(51) Int. Cl.
*G11B 5/596* (2006.01)
*G11B 5/09* (2006.01)

(52) U.S. Cl. .................... 360/77.08; 360/48
(58) Field of Classification Search .............. None
See application file for complete search history.

(56) References Cited

U.S. PATENT DOCUMENTS

| | | | | |
|---|---|---|---|---|
| 6,025,970 A * | 2/2000 | Cheung | .................. | 360/77.08 |
| 6,025,971 A * | 2/2000 | Inoue et al. | ............. | 360/77.08 |
| 6,091,564 A * | 7/2000 | Codilian et al. | ............. | 360/75 |
| 6,873,482 B1 * | 3/2005 | Hsieh et al. | .................. | 360/48 |
| 2004/0051994 A1 * | 3/2004 | Akiyama et al. | ........ | 360/77.07 |
| 2004/0090693 A1 * | 5/2004 | Zhang et al. | ................. | 360/48 |

* cited by examiner

*Primary Examiner*—Andrew L. Sniezek
(74) *Attorney, Agent, or Firm*—Fliesler Meyer LLP

(57) ABSTRACT

Perpendicular recorded servo patterns are used such that a first and second servo fields can be positioned with a common border to define a desired track position.

23 Claims, 9 Drawing Sheets

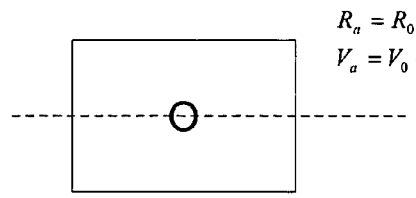
FIGURE
6A
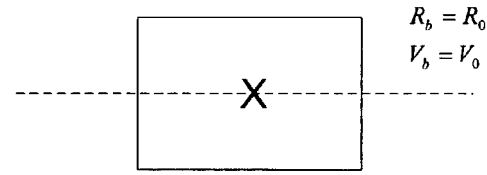
FIGURE
6B
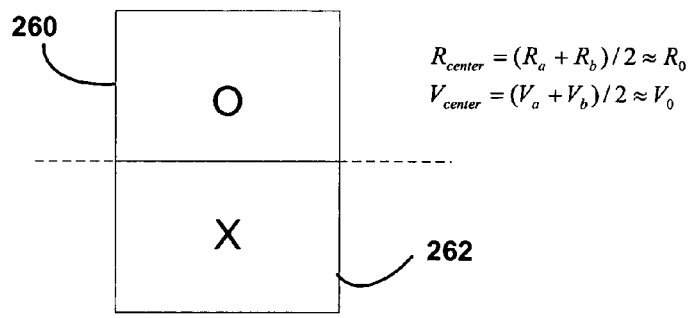
FIGURE
6C
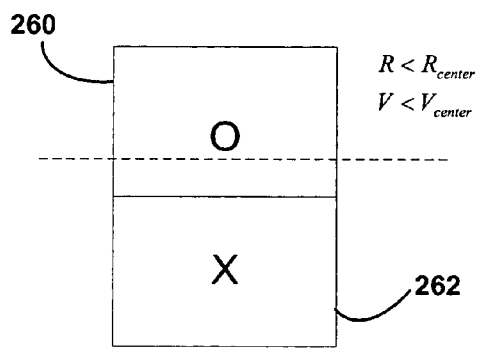
FIGURE
6D
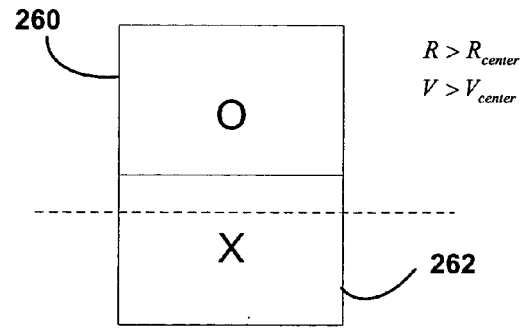
FIGURE
6E

SYSTEM AND METHOD FOR PERPENDICULARLY RECORDED SERVO PATTERN

CLAIM OF PRIORITY

This application claims priority of U.S. Provisional Application No. 60/532,431, entitled "Perpendicularly Recorded Servo Patterns", filed Dec. 24, 2003 and U.S. Provisional Application No. 60/532,395, entitled "Method for Perpendicularly Recorded Servo Patterns", filed Dec. 24, 2003.

FIELD OF THE INVENTION

The present invention relates to rotating media storage device, such as hard disk drives.

BACKGROUND

Rotating media storage devices are an integral part of computers and other devices with needs for large amounts of reliable memory. Rotating media storage devices are inexpensive, relatively easy to manufacture, forgiving where manufacturing flaws are present, and capable of storing large amounts of information in relatively small spaces.

A typical rotating media storage device includes a head disk assembly and electronics to control operation of the head disk assembly. The head disk assembly can include one or more disks. A disk includes a recording surface to receive and store user information. The recording surface can be constructed of a substrate of metal, ceramic, glass or plastic with a thin magnetizable layer on either side of the substrate. Data is transferred to and from the recording surface via a head mounted on an actuator assembly. Heads can include one or more read and/or write elements, or read/write elements, for reading and/or writing data. Drives can include one or more heads for reading and/or writing. In magnetic disk drives, heads can include a thin film inductive write element and a magneto-resistive read element.

Disk drives can operate in one or more modes of operations. In a seek mode a head moves from its current location, across a disk surface to a selected track. In a track following mode, a head is positioned over a selected track for reading data from a track or writing data to a track.

In order to move a head to a selected track or to position a head over selected tracks for writing and reading, servo control electronics are used. In some disk drives, one disk can be dedicated to servo. The servo disk can have embedded servo patterns that are read by a head. Heads for data disks can be coupled to the servo disk head to be accurately positioned over selected tracks. In other disk drives, servo information can be embedded within tracks on the medium at regular intervals. Servo information is read as a head passes over a track to accurately position the head relative to a track.

While servo positioning circuitry is generally accurate, heads can drift from desired locations during track following operations. Reading or writing data during inaccurate head positioning can have adverse affects on drive performance.

In modern disk drives, tracks are placed increasingly closer together to increase data storage capacity. Narrower tracks are often used in order to increase the tracks per inch (TPI) on a disk. Measures should be used in drives to ensure that reliability and performance are maintained as data storage capacity increases.

BRIEF SUMMARY

Systems and devices in accordance with embodiments of the present invention use perpendicularly recorded servo fields rather than longitudinally recorded servo bursts. In one embodiment, the servo fields are adjacent sharing a common border that defines a desired track path.

Other features, aspects, and objects of the invention can be obtained from a review of the specification, the figures, and the claims.

BRIEF DESCRIPTION OF THE DRAWINGS

FIGS. 6A–6E is an illustration of perpendicularly recorded servo fields.

DETAILED DESCRIPTION

Figure 1:
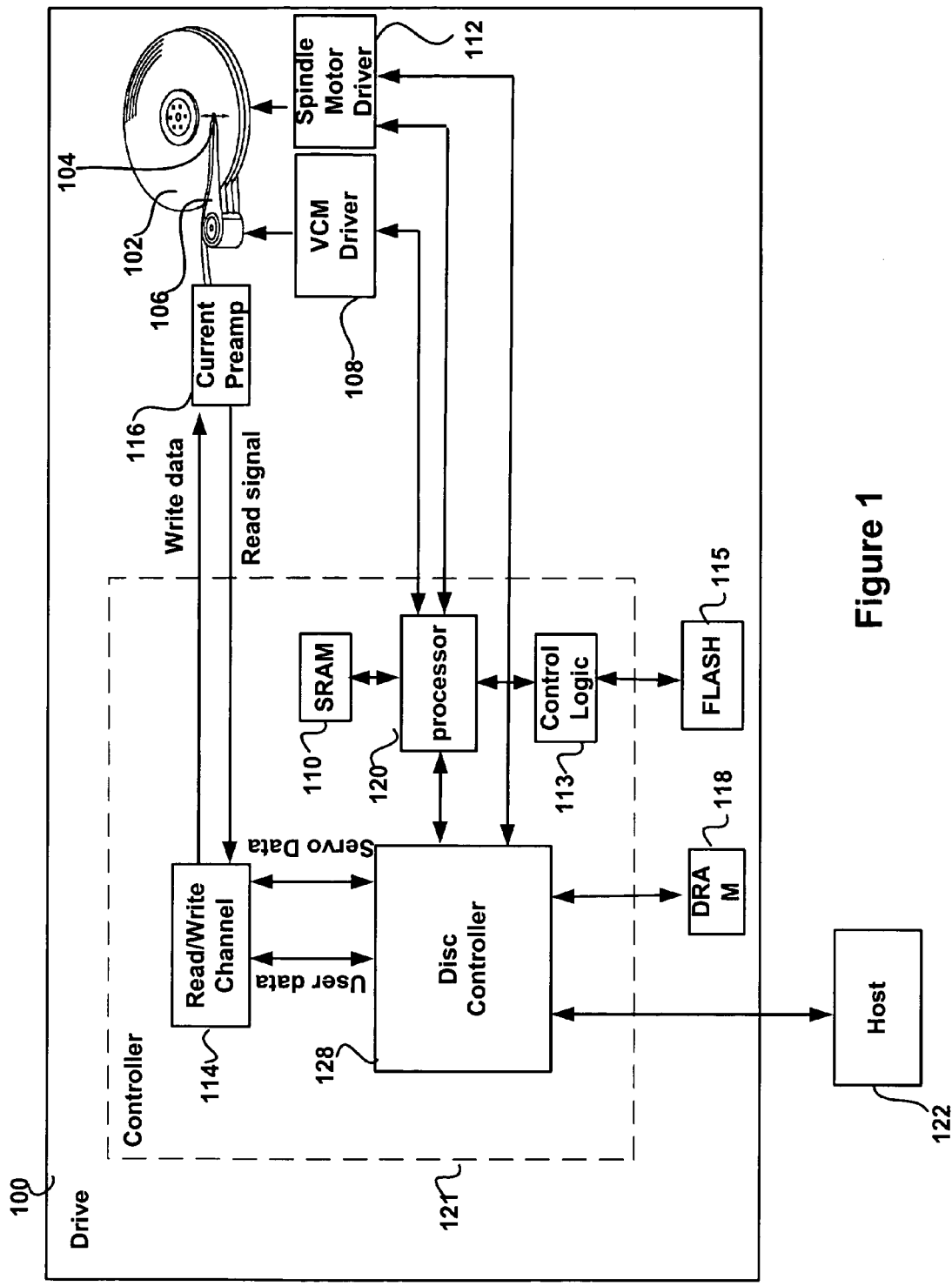
FIG. 1 is a diagram showing components of an exemplary disk drive that can be used in accordance with one embodiment of the present invention.

FIG. 1 shows a rotating media storage device 100 that can be used in accordance with one embodiment of the present invention. In this example, the rotating media storage device 100 is a hard disk drive. The rotating media storage device 100 includes at least one rotatable storage medium 102 capable of storing information on at least one surface. Numbers of disks and surfaces may vary by disk drive. In a magnetic disk drive, storage medium 102 is a magnetic disk. A closed loop servo system, including an actuator arm 106, can be used to position head 104 over selected tracks of disk 102 for reading or writing, or to move head 104 to a selected track during a seek operation. In one embodiment, head 104 is a magnetic transducer adapted to read data from and write data to the disk 102. In another embodiment, head 104 includes separate read elements and write elements. The separate read element can be a magnetoresistive (MR) head. Multiple head configurations may be used.

The servo system can include an actuator unit 108, which may include a voice coil motor driver to drive a voice coil motor (VCM) for rotating of the actuator arm 106. The servo system can also include a spindle motor driver 112 to drive a spindle motor (not shown) for rotation of the disk 102. Controller 121 can be used to control the rotating media storage device 100. The controller 121 can include a number of arrangements. In one embodiment, the controller includes a disk controller 128, read/write channel 114, processor 120, SRAM 110, and control logic on one chip. These elements can also be arranged on multiple chips. The controller can include fewer elements as well.

In one embodiment, the controller 121 is used to control the VCM driver 108 and spindle motor driver 112, to accept information from a host 122 and to control many disk functions. A host can be any device, apparatus, or system capable of utilizing the data storage device, such as a personal computer or Web server. The controller 121 can include an interface controller in some embodiments for communicating with a host and in other embodiments, a separate interface controller can be used. The controller 121 can also include a servo controller, which can exist as circuitry within the drive or as an algorithm resident in the controller 121, or as a combination thereof. In other embodiments, an independent servo controller can be used.

Disk controller 128 can provide user data to a read/write channel 114, which can send signals to a current amplifier or pre-amp 116 to be written to the disk(s) 102, and can send servo signals to the microprocessor 120. Controller 121 can also include a memory controller to interface with memory such as the DRAM 118 and FLASH memory 115. FLASH memory 115 can be used as non-volatile memory to store a code image. DRAM 118 can be used as a buffer memory and to store the code to be executed along with the SRAM 110.

Figure 2:
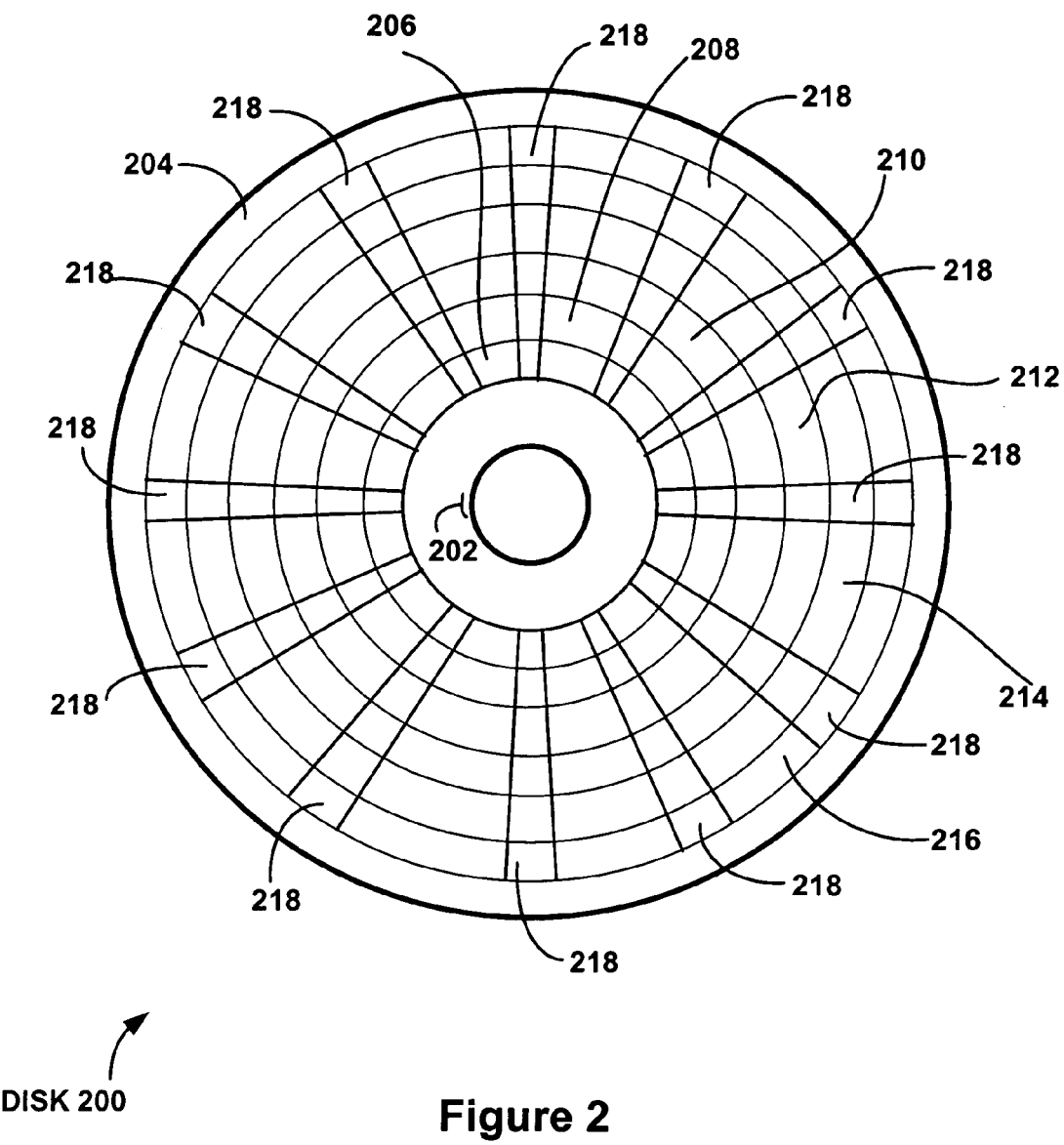
FIG. 2 is a top view of a rotatable storage medium that can be used in the drive of FIG. 1.

The information stored on a disk can be written in concentric tracks. FIG. 2 is a top view of an exemplary rotatable storage disk 200. A multiplicity of concentric tracks extend from near an inner diameter (ID) 202 of the disk 200 to near an outer diameter (OD) 204. These tracks may be arranged within multiple data zones 206–216, extending from the ID 202 to the OD 204. Data zones can be used to optimize storage within the data storage tracks because the length of a track in inner data zone 206 may be shorter than the length of a track at outer zone 216. While eight zones are shown in FIG. 2, any number of zones may be used. For example, sixteen zones are used in one embodiment. Disk 200 includes multiple servo sectors 218, also referred to as servo wedges. In this example, servo sectors 218 are equally spaced about the circumference of storage disk 200.

Figure 3:
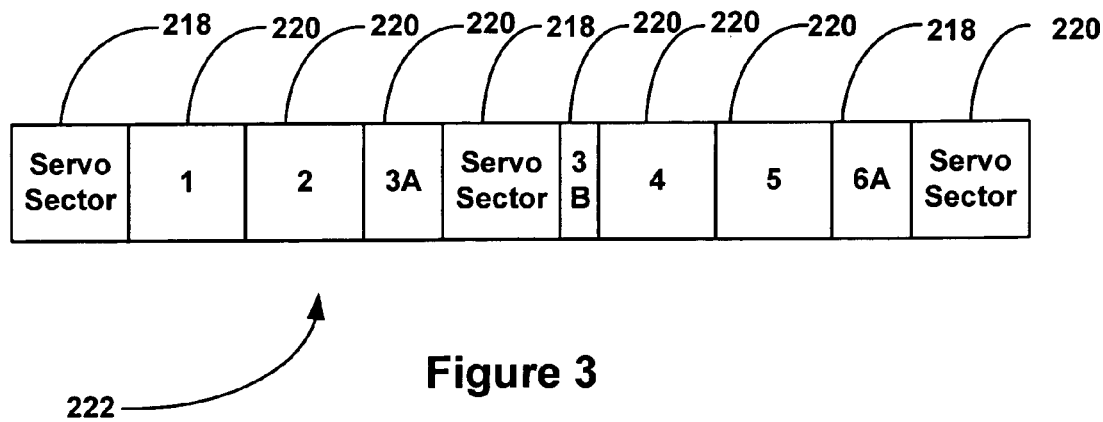
FIG. 3 is an illustration of a track of the medium of FIG. 2.

An exemplary track 222 of storage disk 200 is illustrated in FIG. 3. Servo sectors 218 split the track 222 into multiple data sectors 220. Each servo sector 218 is associated with the immediately following data sectors 220, as defined by a direction of rotation of disk 200. In the exemplary embodiment shown, identification fields for each data sector 220 are not used. As is illustrated, servo sectors can split data sectors resulting in a non-integer number of data sectors between servo wedges. The number of tracks may vary by embodiment. In one embodiment, for example, the number exceeds two thousand.

Figure 4:
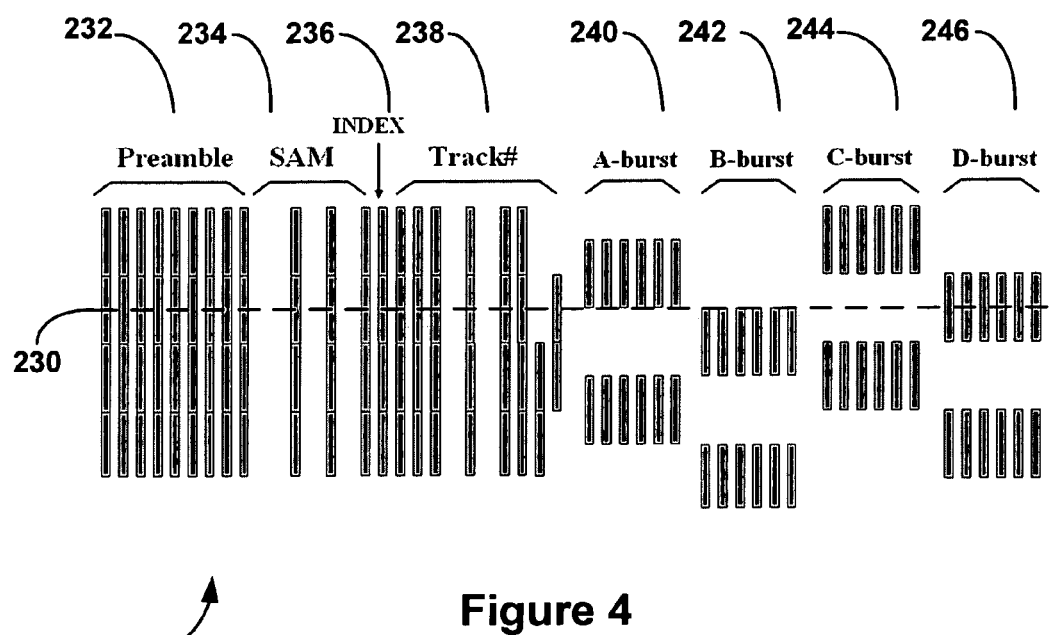
FIG. 4 is an illustration of a servo sector of the track of FIG. 3.

An exemplary servo sector 218 is illustrated in FIG. 4. The servo information shown includes a preamble 232, a servo address mark ("SAM") 234, an index 236, a track number 238, and servo bursts 240–246. These fields are exemplary, as other fields may be used in addition to, or in place of, the exemplary fields, and the order in which the fields occur may vary. The preamble 232 can be a series of magnetic transitions which can represent the start of the servo sector 218. In the servo sector of FIG. 4, the SAM 234 specifies the beginning of available information from the servo sector 218. The track number 238, usually gray coded, is used for uniquely identifying each track. Servo bursts 240–246 are positioned regularly about each track, such that when a data head reads the servo information, a relative position of the head can be determined that can be used by a servo processor to adjust the position of the head relative to the track. This relative position can be determined by looking at the PES value of the appropriate bursts. The PES, or position error signal, is a signal representing the position of a head or element relative to a track centerline.

FIG. 4 shows prior art longitudinally encoded bursts. A centerline 230 for a given data track can be defined by a series of bursts, burst edges, or burst boundaries, such as a burst boundary defined by the lower edge of A-burst 240 and the upper edge of B-burst 242. For example, if a read head evenly straddles an A-burst and a B-burst, or portions thereof, then servo demodulation circuitry in communication with the head can produce equal amplitude measurements for the two bursts, as the portion of the signal coming from the A-burst above the centerline is approximately equal in amplitude to the portion coming from the B-burst below the centerline. The resulting computed PES can be zero if the radial location defined by the A-burst/B-burst (A/B) combination, or A/B boundary, is the center of a data track, or a track centerline. In such an embodiment, the radial location at which the PES value is zero can be referred to as a null-point. Null-points can be used in each servo wedge to define a relative position of a track. If the head is too far towards the outer diameter of the disk, or above the centerline in FIG. 4, then there will be a greater contribution from the A-burst that results in a more "negative" PES. Using the negative PES, the servo controller could direct the voice coil motor to move the head toward the inner diameter of the disk and closer to its desired position relative to the centerline. This can be done for each set of burst edges defining the shape of that track about the disk.

Figure 5:
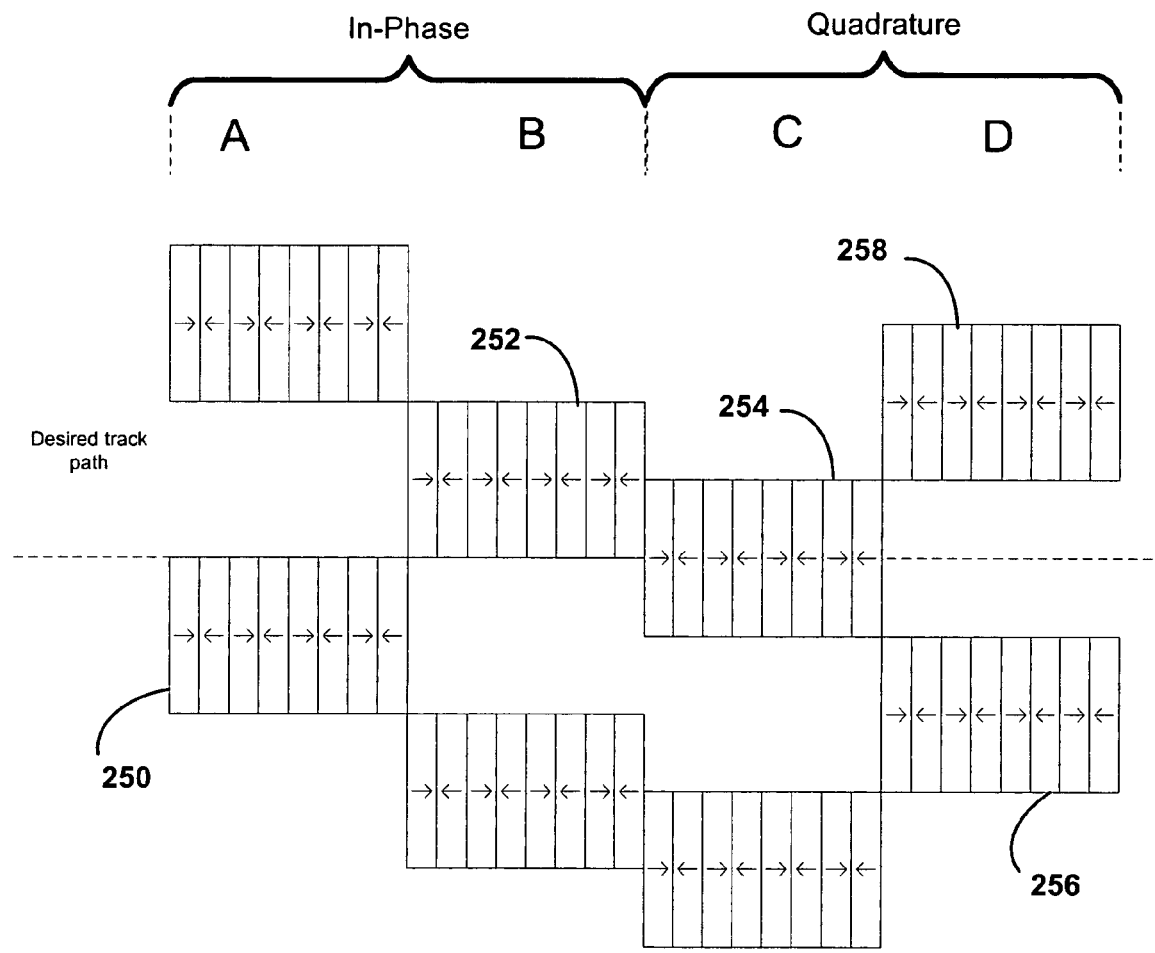
FIG. 5 is an illustration of prior art longitudinally recorded servo bursts.

FIG. 5 illustrates prior art longitudinally recorded servo bursts. In this example, each longitudinally recorded burst includes an alternating pattern of longitudinal magnetizations. FIG. 5 illustrates only a few changes in magnetization; but typically a relatively large number of longitudinal magnetization changes are done for each of the longitudinal servo bursts. The detected signals for the in-phase and quadrature region are transferred across the channel. The height of the detected signal can be used to get an indication of the closeness of the head to the servo field on the disk. As shown in FIG. 5, for the in-phase region, the detected peak values, for the servo burst 250 and server burst 252 are stored. The peak value for the burst 252 is subtracted from the peak value from the burst 250 to obtain the in-phase value. The in-phase value can be used as a position error signal (PES) to be minimized by the system. In the quadrature region, the value for the servo burst 254 is maximized compared to the detected values for the servo bursts 256 and 258.

FIGS. 6A–6E illustrate the use of perpendicular recorded servo field using a "DC" perpendicular recorded servo field. The value is called "DC" because the flux can be relatively constant in time. FIG. 6 shows the use of a perpendicular recorded DC values for use along with a magnetoresistive read head. Magnetoresistive read heads use the change in resistively of an MR strip to detect a magnetic field. FIG. 6A illustrates an example in which flux is flowing perpendicular outside of the media. In this example, the resistively of the MR strip changes from $R_0$ to $R_0-\Delta R$. If a constant current is flowing through the magnetoresistive head the detected voltage for the magnetic resisted head changes from the $V_0$ to $V_0-\rho V$. FIG. 6B illustrates an example when the flux is flowing perpendicularly into the medium. In this case the resistance of the magnetoresistive head changes from $R_0$ to $R_0+\Delta R$, and the detected voltage changes from $V_0$ to $V_0+\Delta V$.

FIG. 6C illustrates an example where the magnetoresistive head flows directly over a border between the field 260 where the flux flows perpendicular outside the medium, and the field 262, where the flux flows perpendicular into the medium. Looking at FIG. 6D, when the path goes more thorough the field 260 than the field 262, the resistance of the magnetoresistive head is less than the resistance of the MR head positioned at the center and the voltage for constant current is less then the voltage at the center. Looking at FIG. 6E, when the path of the magnetoresistive head flows more over the field 262 than field 260, the resistance of the MR head is greater than the resistance at the center and thus the voltage is greater than the voltage at the center. In this way, having the fields which border each other can be used to determine the desired center position for track on a disk.

Figure 7:
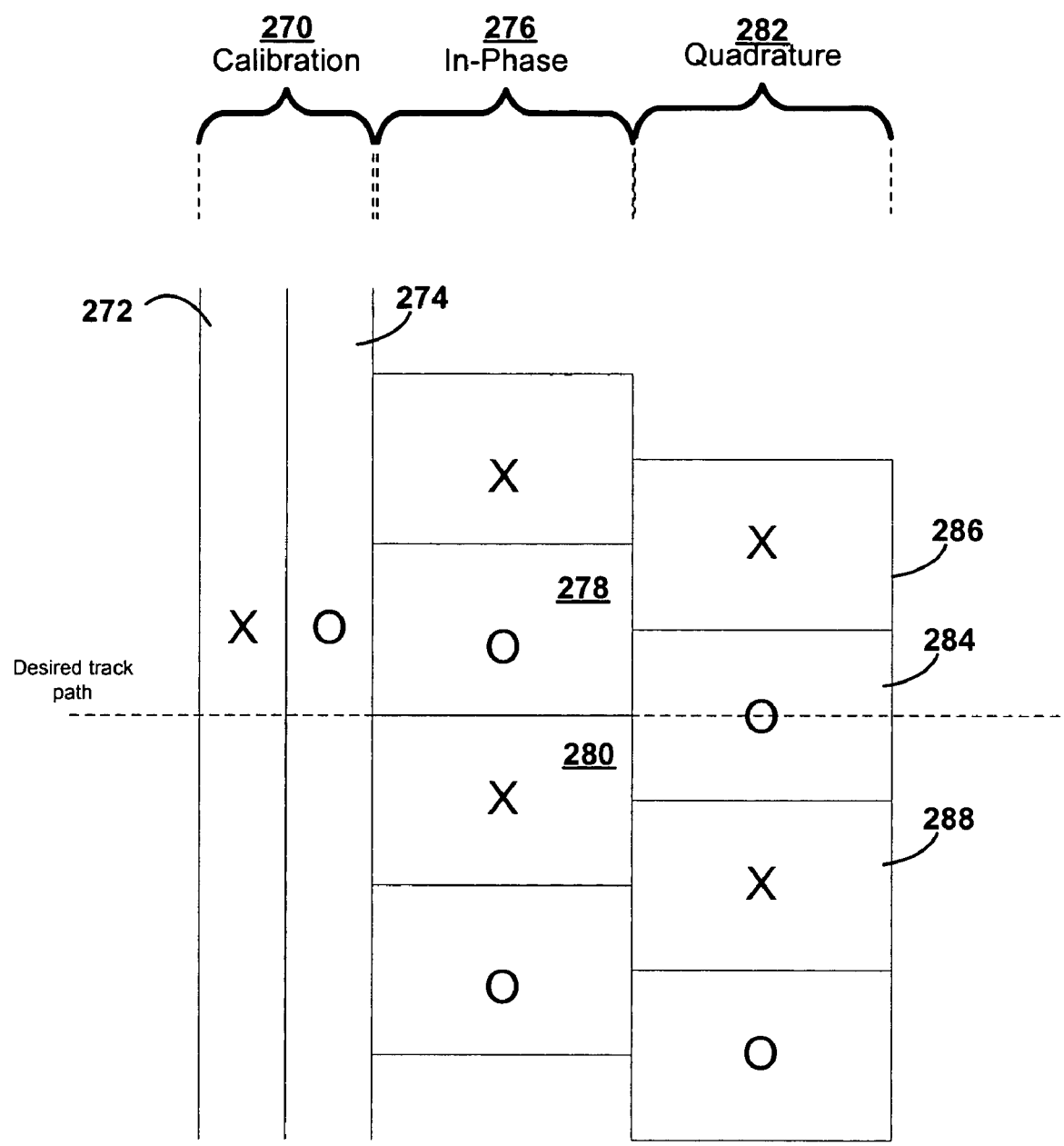
FIG. 7 is an illustration of a perpendicularly recorded servo pattern.

Each MR head might have different characteristics due to the process variations in the construction of the MR head. In one embodiment, it is useful to have a calibration region 270 as shown in FIG. 7. In the example of FIG. 7, the calibration region 270 includes a first field 272 in which the flux flows perpendicular into the medium and a second field 274 which the flux flows perpendicular out of the medium. The example of FIG. 7 includes an in-phase region 276 which in the example of FIG. 7 includes bordering servo fields 278, in which the magnetic flux flows perpendicular outside the medium, and field 280, in which the magnetic flux flows perpendicular into the medium. The desired track path is the border between regions 278 and 280. Quadrature portion 282 helps improve the determination of the desired track path with an MR head.

Figure 9:
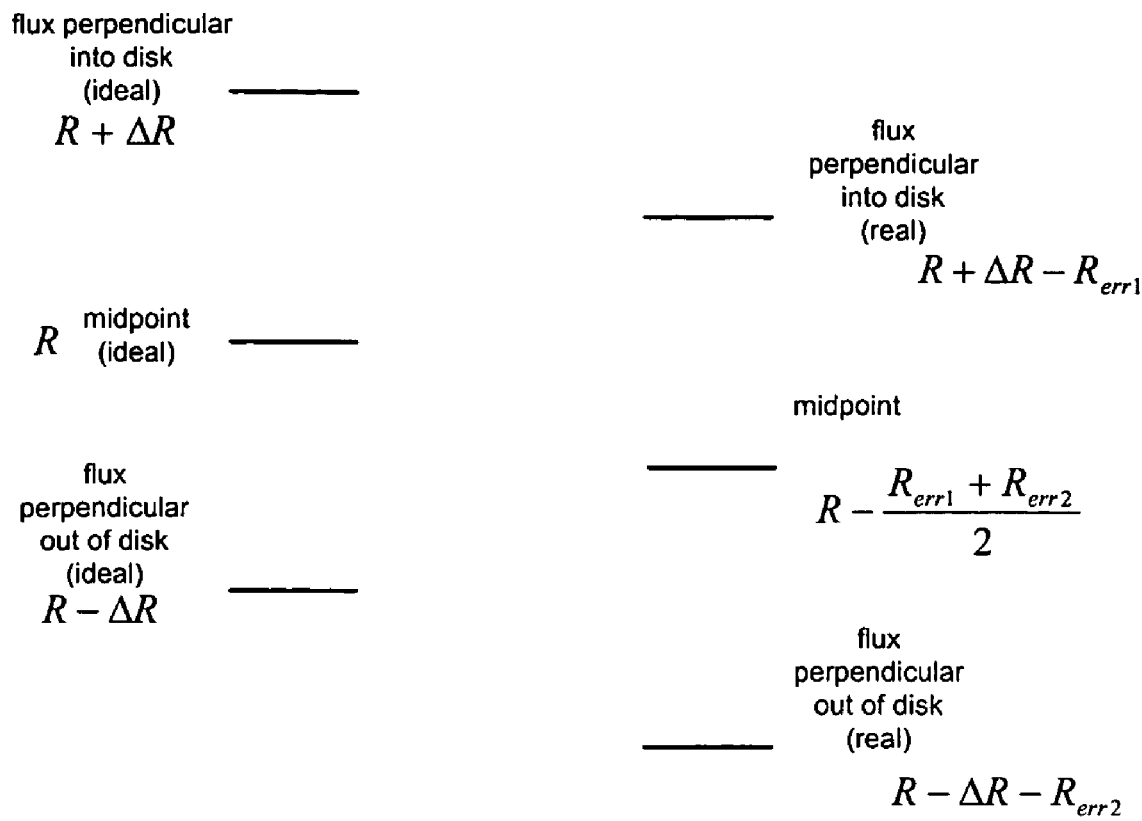
FIG. 9 is an illustration of the use of the calibration regions for one embodiment of the present invention.

FIG. 9 shows an example of the use of the calibration fields. Ideal detected values of the resistivity for the flux in and flux out cases are symmetric about the resistively $R_0$, where $R_0$ is the stripe resistance for zero flux. In the real case, the detected resistivies may not be symmetric so that the midpoint may not be at the resistively $R_0$. Determining the value of the stripe resistance over the range of $\pm\phi$, where $\phi$ is the flux emitted from the media allows for the determination of the MR stripe resistance for the case where the head is positioned at the center of 260 and 262.

Figure 10:
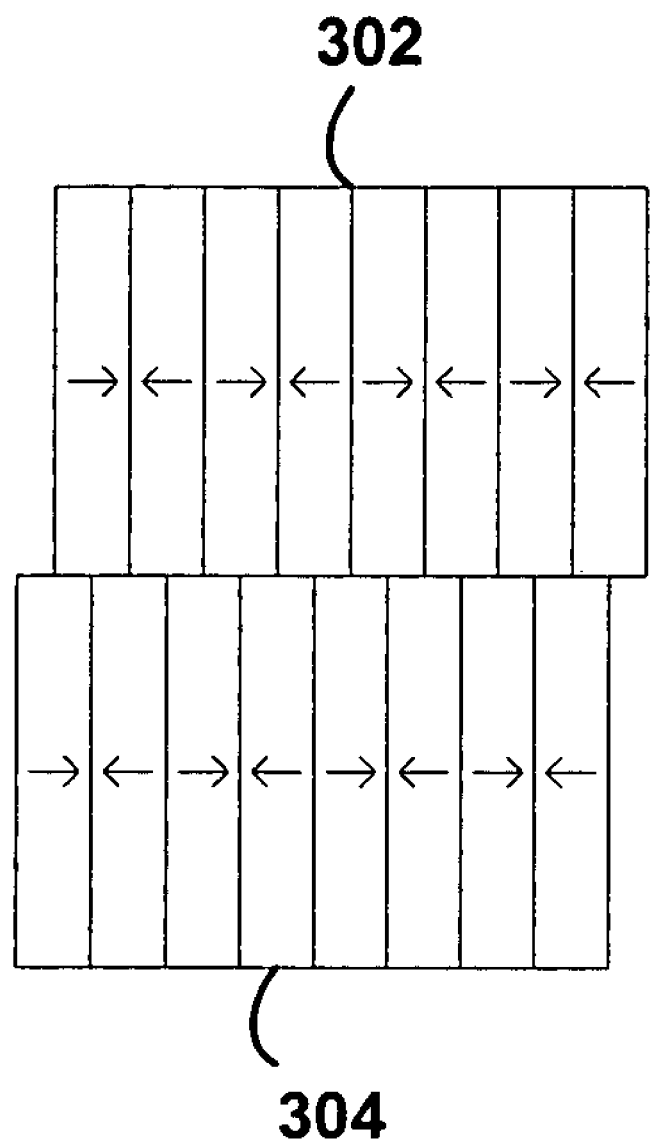
FIG. 10 is an illustration showing misaligned AC bursts.

The system of FIG. 7 has a spacing advantage over the system of FIG. 5. Since the fields 278 and 280 of the in-phase portion can be positioned side by side sharing a common border, the length of the in-phase portion can be reduced. An AC longitudinal servo busts cannot be positioned side by side due to the difficulty of aligning the AC bursts. FIG. 10 shows slightly misaligned AC bursts 302 and 304 that do not produce a useable servo signal. Perpendicular recorded servo patterns reduce the disk space required for the servo portion allowing for a larger amount of the disk to be used for reading and writing data.

Figure 8:
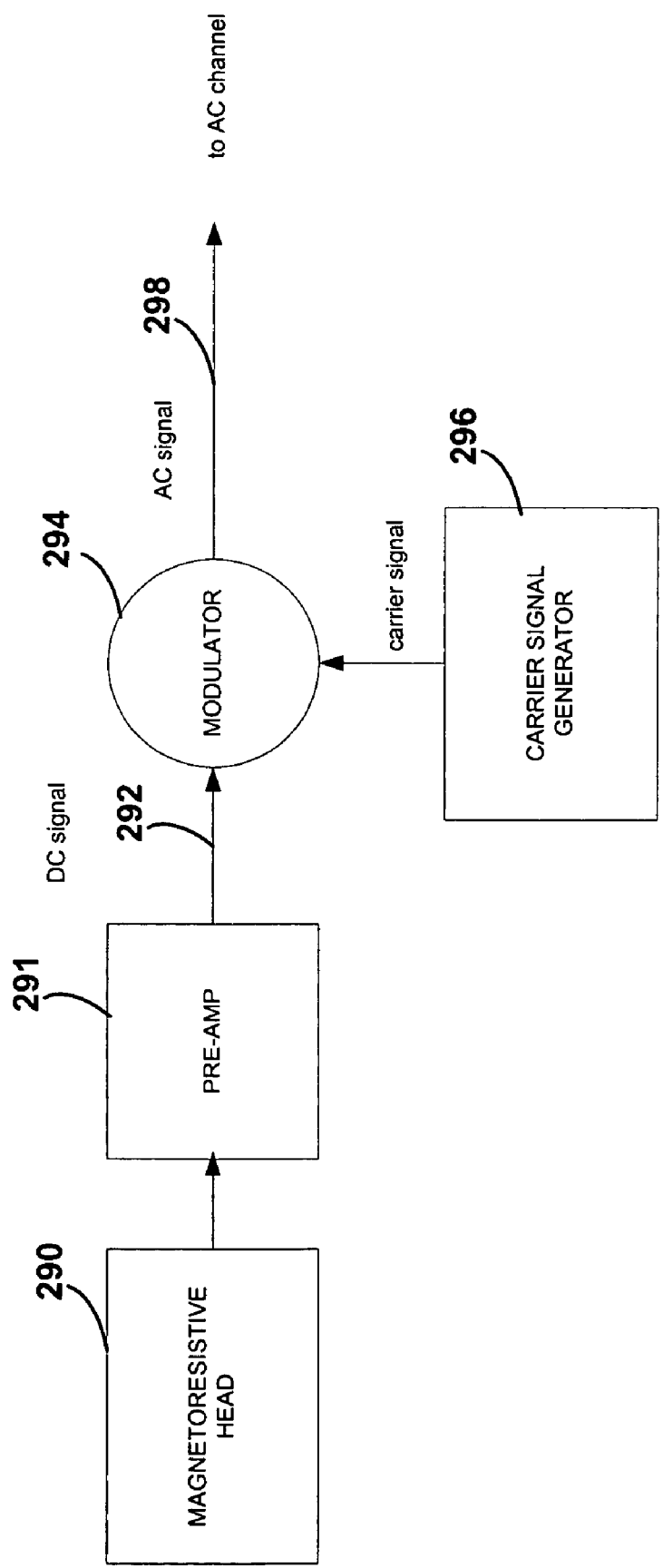
FIG. 8 is an illustration of a modulator for converting a DC signal from a magnetoresistive head to an AC signal to send across an AC channel.

FIG. 8 illustrates one embodiment of the system of the present invention. In this embodiment, the MR head 290 produces an output as a result of the perpendicularly recorded DC servo fields. The output is sent to preamp 291 that produces a DC signal on line 292 as a result of the perpendicularly recorded DC servo fields. This DC signal value can be sent to a modulator 294 which causes the DC signal to be modulated with a carrier signal produced by the carrier signal generator 296. The carrier signal can be a train of sampling pulses. The modulator 294 produces the AC signal on line 298 which can be sent across an AC coupled channel. AC coupled channels are typical on hard drive devices.

The foregoing description of the preferred embodiments for the present invention has been provided for the purposes of illustration and description. It is not intended to be exhaustive or to limit the invention to the precise forms disclosed. Many modifications and variation will be apparent to one of ordinary skill in the relevant arts. The embodiments where chosen and described in order to best explain the principles of the invention and its practical application, thereby enabling others in the art to understand the invention for various embodiments and with various modification that are suited to the particular use contemplated. It is intended that the scope of the invention be defined by the claims and their equivalents.

What is claimed is:

1. A disk for a rotating media storage device comprising:
   data sectors and,
   non-overlapping servo sectors, at least one servo sector including:
   a first servo field having magnetic flux flowing perpendicular out of the disk; and
   a second servo field having magnetic flux flowing perpendicular into the disk, wherein the first and second servo field are adjacent such that a border between the first and second servo fields defines a desired center position for a track.

2. The disk of claim 1, wherein the first and second servo fields are in-phase servo fields and wherein addition servo fields are used for quadrature servo fields.

3. The disk of claim 2, wherein the quadrature servo fields include a third servo field and a forth servo field, the third and forth servo fields being adjacent and sharing a border with the first servo field.

4. The disk of claim 1, wherein the magnetization is relatively constant throughout the first servo field.

5. The disk of claim 1, further including first and second calibration fields, the first calibration field having magnetic flux flowing perpendicular out of the disk and the second calibration field having magnetic flux flowing perpendicular into the disk.

6. A rotating media storage device including the disk of claim 1, further including a magnetoresistive read head that detects flux from the first and second servo field.

7. The rotating media storage device of claim 6, further wherein the output of the magnetoresistive head adjacent to the first and second servo fields is modulated with a carrier signal.

8. A rotating media storage device including:
   a magnetoresistive read head; and
   at least one disk, the at least one disk including data sectors and non-overlapping servo sectors, at least one servo sector including a first servo field having magnetic flux flowing perpendicular out of the disk and a second servo field having magnetic flux flowing perpendicular into the disk, wherein the first and second servo field are adjacent such that a border between the first and second servo fields defines a desired center position for a track.

9. The rotating media storage device of claim 8, wherein the first and second servo fields are in-phase servo fields and wherein addition servo fields are used for quadrature servo fields.

10. The rotating media storage device of claim 9, wherein the quadrature servo fields include a third servo field and a forth servo field, the third and forth servo fields being adjacent and sharing a border with the first servo field.

11. The rotating media storage device of claim 8, wherein the magnetization is relatively constant throughout the first servo field.

12. The rotating media storage device of claim 8, further including first and second calibration fields, the first calibration field having magnetic flux flowing perpendicular out of the disk and the second calibration field having magnetic flux flowing perpendicular into the disk.

13. The rotating media storage device of claim 12, wherein the output of the magnetoresistive head adjacent to the first and second servo fields is modulated with a carrier signal.

14. A method comprising:
using a magnetoresistive read head to determine a desired center position track position on a disk including data sectors and non-overlapping servo sectors by detecting a first servo field and second servo field, wherein the first servo field has a magnetic flux flowing perpendicular out of out of the disk and the second servo field has magnetic flux flowing perpendicular into the substrate, wherein the first and second servo field are adjacent such that a border between the first and second servo fields defines the desired center position for a track; and
adjusting the magnetoresistive head to move towards the center position.

15. The method of claim 14, wherein the first and second servo fields are in-phase servo fields and wherein the disk further includes quadrature servo fields.

16. The method of claim 15, wherein the quadrature servo fields include a third servo field and a forth servo field, the third and forth servo fields being adjacent and sharing a border with the first servo field.

17. The method of claim 14, wherein the magnetization is relatively constant throughout the first servo field.

18. The method of claim 14, wherein the disk further includes first and second calibration fields, the first calibration field having magnetic flux flowing perpendicular out of the disk and the second calibration field having magnetic flux flowing perpendicular into the disk.

19. The method of claim 18, wherein the calibration fields are used to calibrate the sensitivities of the magnetoresistive head to magnetic flux perpendicularly in and out of the disk.

20. The method of claim 14, wherein the output of the magnetoresistive head adjacent to the first and second servo fields is modulated with a carrier signal.

21. A disk for a rotating media storage device comprising:
in-phase servo fields including
a first servo field having magnetic flux flowing perpendicular out of the disk; and
a second servo field having magnetic flux flowing perpendicular into the disk, wherein the first and second servo field are adjacent such that a border between the first and second servo fields defines a desired center position for a track
and quatrature servo fields including
a third servo field having magnetic flux flowing perpendicular out of the disk; and
a forth servo field having magnetic flux flowing perpendicular into the disk, wherein the third and forth servo fields are adjacent to and sharing a border with the first servo field.

22. The disk of claim 21, wherein the magnetization is relatively constant throughout the first servo field.

23. The disk of claim 21, further including first and second calibration fields, the first calibration field having magnetic flux flowing perpendicular out of the disk and the second calibration field having magnetic flux flowing perpendicular into the disk.

* * * * *